US012777426B2

(12) United States Patent
Pettersson et al.

(10) Patent No.: US 12,777,426 B2
(45) Date of Patent: Oct. 27, 2026

(54) PACKET TRANSMISSION IN AN UNLICENSED COMMUNICATION ENVIRONMENT

(71) Applicant: Telefonaktiebolaget LM Ericsson (publ), Stockholm (SE)

(72) Inventors: Charlie Pettersson, Solna (SE); Leif Wilhelmsson, Lund (SE); Miguel Lopez, Aachen (DE); Abhishek Ambede, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 291 days.

(21) Appl. No.: 18/691,214

(22) PCT Filed: Sep. 13, 2021

(86) PCT No.: PCT/EP2021/075092

§ 371 (c)(1),
(2) Date: Mar. 12, 2024

(87) PCT Pub. No.: WO2023/036444

PCT Pub. Date: Mar. 16, 2023

(65) Prior Publication Data

US 2025/0142483 A1 May 1, 2025

(51) Int. Cl.
*H04W 52/24* (2009.01)
*H04W 16/14* (2009.01)

(52) U.S. Cl.
CPC ......... *H04W 52/241* (2013.01); *H04W 16/14* (2013.01)

(58) Field of Classification Search
CPC ... H04W 52/24; H04W 52/241; H04W 16/14; H04L 1/0026; H04L 1/0029
See application file for complete search history.

(56) References Cited

U.S. PATENT DOCUMENTS 9,775,034 B2 * 9/2017 Hekstra .................... H04K 1/02
11,223,982 B2 * 1/2022 Zhang .................. H04W 16/14
(Continued)

FOREIGN PATENT DOCUMENTS

WO WO-2019125391 A1 * 6/2019 ........... H04L 9/0643

OTHER PUBLICATIONS

International Search Report and Written Opinion dated May 27, 2022 for International Application No. PCT/EP2021/075092 filed Sep. 13, 2021, consisting of 11 pages.
802.11 Working Group of the LAN/MAN Standards Committee of the IEEE Computer Society, IEEE P802.11axTM/D6.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Nov. 2019, consisting of 780 pages.
(Continued)

*Primary Examiner* — Hai V Nguyen
(74) *Attorney, Agent, or Firm* — Weisberg I.P. Law, P.A.

(57) ABSTRACT

A method is disclosed for transmission of one or more packets in an unlicensed communication environment based on a transmit power setting. Each packet includes a first part and a second part, wherein the first part is associated with a potential received signal-to-noise ratio (SNR) when the transmit power setting is used. The method includes processing the first part of the one or more packets before transmission, wherein the processing comprises enforcing a reduced received SNR for the first part, which is lower than the potential received SNR. In some embodiments, enforcing the reduced received SNR for the first part includes adding noise to the first part and/or applying a decreased transmit power setting for the first part. In some embodiments, the transmission of the one or more packets is in accordance with an IEEE 802.11 standard and the first part is a legacy preamble.

20 Claims, 2 Drawing Sheets

(56) References Cited

U.S. PATENT DOCUMENTS

| | | | | |
|---|---|---|---|---|
| 11,277,739 | B2 * | 3/2022 | Min | H04L 5/0048 |
| 11,405,813 | B2 * | 8/2022 | Lin | H04L 27/0006 |
| 11,570,636 | B2 * | 1/2023 | Ergen | H04W 72/541 |
| 11,575,407 | B2 * | 2/2023 | Payton | G06F 21/606 |
| 11,706,811 | B2 * | 7/2023 | Abedini | H04W 74/002 370/329 |
| 12,047,326 | B2 * | 7/2024 | Ijaz | H04L 5/001 |
| 2016/0234684 | A1 * | 8/2016 | Hekstra | G06F 21/30 |
| 2016/0360269 | A1 * | 12/2016 | An | H04N 21/25891 |
| 2017/0180809 | A1 * | 6/2017 | An | H04N 21/4667 |
| 2020/0196207 | A1 * | 6/2020 | Zhang | H04W 16/14 |
| 2021/0051507 | A1 * | 2/2021 | Lin | H04W 16/14 |
| 2021/0377728 | A1 * | 12/2021 | Min | H04W 12/037 |
| 2021/0409976 | A1 * | 12/2021 | Ergen | H04W 72/541 |
| 2022/0060305 | A1 * | 2/2022 | Ijaz | H04L 5/001 |
| 2022/0095178 | A1 * | 3/2022 | Zhang | H04W 16/14 |
| 2022/0312488 | A1 * | 9/2022 | Abedini | H04W 74/002 |
| 2025/0380280 | A1 * | 12/2025 | Wirth | H04B 7/06954 |
| 2026/0100747 | A1 * | 4/2026 | Wirth | H04B 7/0695 |

OTHER PUBLICATIONS 802.11 Working Group of the LAN/WAN Standards Committee of the IEEE, P802.11azTM/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for positioning, Apr. 2020, consisting of 242 pages.

Da Silva, C., IEEE P802.11 Wireless LANs, SENS SG Proposed CSD Draft, doc.: IEEE 802.11-20/0042r6, Intel, Jul. 10, 2020, consisting of 7 pages.

Da Silva., C., IEEE P802.11 Wireless LANs, 802.11 SENS SG Proposed PAR, doc.: IEEE P802.11-19/2103r122, Intel, Aug. 3, 2020, consisting of 5 pages.

* cited by examiner

PACKET TRANSMISSION IN AN UNLICENSED COMMUNICATION ENVIRONMENT

CROSS-REFERENCE TO RELATED APPLICATION

This application is a Submission Under 35 U.S.C. § 371 for U.S. National Stage Patent Application of International Application Number: PCT/EP2021/075092, filed Sep. 13, 2021 entitled "PACKET TRANSMISSION IN AN UNLICENSED COMMUNICATION ENVIRONMENT," the entirety of which is incorporated herein by reference.

TECHNICAL FIELD

The present disclosure relates generally to the field of wireless communication. More particularly, it relates to packet transmission in an unlicensed communication environment.

BACKGROUND

Packets transmitted in an unlicensed communication environment may, in some scenarios, be used for wireless positioning and/or wireless sensing.

Wireless positioning can be performed by timing detection. To this end, a positioning receiver device receives physical layer packets transmitted by a positioning transmitter device, and performs timing measurements thereon. The measurements are used for position determination of absolute and/or relative position of transmitter and/or of the positioning receiver.

Wireless positioning may be seen as an enhancement for radio technologies that have been designed primarily for communication. For example, the IEEE 802.11 Working Group has initiated the task group 802.11az with the purpose of developing a standard amendment to support wireless positioning (next generation positioning, NGP). The IEEE 802.11az amendment is developed based on the IEEE 802.11ax High Efficiency (HE) amendment.

Wireless sensing can be performed by detecting changes in a wireless propagation channel. To this end, a sensing receiver device receives multiple physical layer packets transmitted by a sensing transmitter device, and performs measurements thereon. The measurements are used to detect and/or classify the occurrence of events.

Wireless sensing may be seen as an enhancement for radio technologies that have been designed primarily for communication. For example, the IEEE 802.11 Working Group has initiated the task group 802.11bf with the purpose of developing a standard amendment to support wireless sensing. It is expected that the IEEE 802.11 version of wireless sensing will build on the IEEE 802.11az amendment since many of the particulars of wireless positioning are also relevant for wireless sensing.

It is a problem that a device under malicious control may be able to utilize packet transmission in an unlicensed communication environment for malicious purposes in the context of wireless positioning and/or wireless sensing.

Therefore, there is a need for improved security in the context of wireless positioning and/or wireless sensing.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for transmission of one or more packets in an unlicensed communication environment based on a transmit power setting. Each packet comprises a first part and a second part, wherein the first part is associated with a potential received signal-to-noise ratio (SNR) when the transmit power setting is used.

The method comprises processing the first part of the one or more packets before transmission, wherein the processing comprises enforcing a reduced received SNR for the first part, which is lower than the potential received SNR.

In some embodiments, enforcing the reduced received SNR for the first part comprises adding noise to the first part.

In some embodiments, the noise is added orthogonally to a signal of the first part in an in-phase/quadrature space.

In some embodiments, the method further comprises dividing an available transmission power of the transmit power setting in first and second portions, allocating the first portion as signal transmission power for the first part, and allocating the second portion as noise transmission power for the first part.

In some embodiments, the transmit power setting is equal for the first and second parts.

In some embodiments, enforcing the reduced received SNR for the first part comprises applying a decreased transmit power setting for the first part.

In some embodiments, a first required minimum received SNR associated with the first part when the transmit power setting is used is lower than a second required minimum received SNR associated with the second part when the transmit power setting is used.

In some embodiments, a difference between the potential received SNR and the first required minimum received SNR is larger than a difference between the reduced received SNR and the first required minimum received SNR.

In some embodiments, the method further comprises determining a value of a difference between the potential received SNR and the reduced received SNR.

In some embodiments, the value of the difference between the potential received SNR and the reduced received SNR is determined based on one or more of: a modulation and coding scheme for the second part, one or more parameters of a channel to an intended receiver, and a desired received SNR at the intended receiver.

In some embodiments, the method further comprises transmitting the one or more packets.

In some embodiments, the transmission of the one or more packets is performed in a transmission opportunity, and the method further comprises transmitting a request-to-send (RTS) message at the start of the transmission opportunity.

In some embodiments, the transmission of the one or more packets is for wireless sensing measurements and/or for wireless positioning measurements.

In some embodiments, enforcing the reduced received SNR for the first part is for increasing security by mitigating malicious measurements being performed on the one or more packets.

In some embodiments, the transmission of the one or more packets is in accordance with an IEEE 802.11 standard.

In some embodiments, each packet is a physical layer conformance procedure protocol data unit (PPDU) or a high efficiency (HE) PPDU.

In some embodiments, the first part is a legacy preamble.

In some embodiments, the second part is the PPDU except the legacy preamble, or the PPDU except the legacy preamble and a HE preamble.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling transmission of one or more packets in an unlicensed communication environment based on a transmit power setting. Each packet comprises a first part and a second part, wherein the first part is associated with a potential received signal-to-noise ratio (SNR) when the transmit power setting is used.

The apparatus comprises controlling circuitry configured to cause processing of the first part of the one or more packets before transmission, wherein the processing comprises enforcement of a reduced received SNR for the first part, which is lower than the potential received SNR.

A fourth aspect is a transmitter device comprising the apparatus of the third aspect.

A fifth aspect is a control node comprising the apparatus of the third aspect.

In some embodiments, any of the above aspects may additionally have features identical with or corresponding to any of the various features as explained above for any of the other aspects.

An advantage of some embodiments is improved (e.g., increased) security in the context of wireless positioning and/or wireless sensing.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when a packet is referred to herein, it may be interpreted as a physical layer packet, for example.

A potential received SNR may, for example, be defined as a received SNR that is achievable by using a transmission format specified for the first part. Generally, approaches have been described under the assumption that a logarithmic scale is used for power levels and SNR values (e.g., decibel, dB). Corresponding details may be derived for linear (or other) scales.

In the following, embodiments will be described for packet transmission in an unlicensed communication environment. According to various embodiments, a reduced received signal-to-noise ratio (SNR) is enforced for a first part of the packet(s) by processing of the first part before transmission. By reducing the received SNR, the transmitter of the packet(s) can effectively reduce its coverage area. Thereby, improved security may be provided in the context of wireless positioning and/or wireless sensing.

Figure 1:
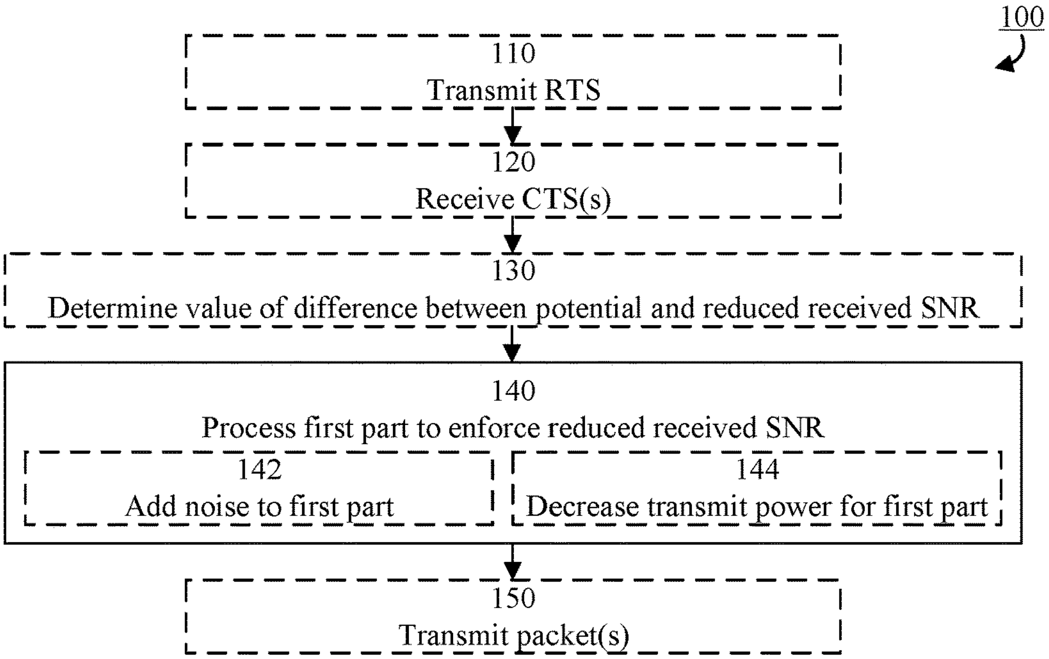
FIG. 1 is a flowchart illustrating example method steps according to some embodiments.

FIG. 1 illustrates an example method 100 according to some embodiments. The method 100 is for transmission of one or more packets in an unlicensed communication environment based on a transmit power setting. In some embodiments, the method 100 is performed by a transmitter device configured to transmit the one or more packets.

Each packet comprises at least a first part and a second part. The first part may be suitable for measurements in relation to positioning and/or sensing. For example, the first part may comprise portions (e.g., specific sequences) for synchronization and/or channel estimation.

In some embodiments, the packets are intended for sensing and/or positioning (possibly also carrying data). Thus, the transmission of the one or more packets may be for wireless sensing measurements and/or for wireless positioning measurements. For example, the transmission of the one or more packets may be in accordance with an IEEE 802.11 standard (e.g., IEEE 802.11az targeting wireless positioning, and/or IEEE 802.11bf targeting wireless sensing).

In some embodiments, the packets are not specifically intended for sensing and/or positioning, but may be used to perform sensing and/or positioning.

When the transmission of the one or more packets is in accordance with an IEEE 802.11 standard (be it IEEE 802.11az, IEEE 802.11bf, or another IEEE 802.11 standard), the first part may be a legacy preamble. Alternatively or additionally, each packet may be a physical layer conformance procedure protocol data unit (PPDU) or a high efficiency (HE) PPDU. Typically, the second part is another part of the PPDU than the first part (e.g., the PPDU except the legacy preamble, or the PPDU except the legacy preamble and a HE preamble).

The transmit power setting may comprise a first default transmission power level applicable for the first part and a second default transmission power level applicable for the second part. The first and second default power levels may have the same or different values.

Generally, a first required minimum received SNR ($SNR_{min\_1}$) is associated with the first part when the transmit power setting (e.g., the first default transmission power level) is used, and a second required minimum received SNR ($SNR_{min\_2}$) is associated with the second part when the transmit power setting (e.g., the second default transmission power level) is used.

It is typical that the first required minimum received SNR is lower than, or equal to, the second required minimum received SNR. Thus, the first part has a format that is more robust than, or equally robust as, a format of the second part.

Generally, a relatively low order of modulation and/or a relatively low code rate entails relatively high robustness. With reference to modulation and coding scheme (MCS) application, relatively low MCSs (e.g., MCSO) may typically be more robust than relatively high MCSs.

The first part is associated with a potential received SNR ($SNR_{pot}$) when the transmit power setting is used (e.g., when the first part is transmitted using the first default transmission power level). Typically, when the potential received SNR is higher than the first required minimum received SNR, the first part can be adequately received at an intended receiver. Adequate reception of the first part may, for example, comprise one or more of: detection of the first part (and correspondingly refraining from transmission), synchronization based on the first part, and performing channel measurements based on the first part.

As illustrated by step 140, the method 100 comprises processing the first part of the one or more packets before transmission, wherein the processing comprises enforcing a reduced received SNR for the first part. The reduced received SNR ($SNR_{red}$) is reduced in relation to the potential received SNR, i.e., the reduced received SNR is lower than the potential received SNR.

The enforcement of the reduced received SNR for the first part may be suitable for increasing security in the context of wireless positioning and/or wireless sensing. For example, the enforcement of the reduced received SNR for the first part may mitigate malicious positioning and/or sensing measurements being performed on the one or more packets (e.g., by an eavesdropper or an impersonator).

In some embodiments, a difference between the potential received SNR and the first required minimum received SNR is larger than a difference between the reduced received SNR and the first required minimum received SNR. This may be seen as a way to align a received SNR margin of the first part with a received SNR margin of the second part; i.e., to bring the received SNR margins for the first and second part closer to each other.

As illustrated by optional step 130, the method 100 may further comprise determining a value of a difference between the potential received SNR and the reduced received SNR (i.e., a how much the potential received SNR is to be reduced to provide the reduced received SNR).

The value of the difference between the potential received SNR and the reduced received SNR may be determined based on one or more of: a modulation and coding scheme for the second part, one or more parameters of a channel to an intended receiver, and a desired received SNR at the intended receiver. Example parameters of a channel include link budget of the channel, path loss of the channel, interference level of the channel, noise level of the channel, multipath characteristics of the channel (e.g., delay spread), etc.

In one example, the value of the difference between the potential received SNR and the reduced received SNR is determined as the difference between the potential received SNR and the first required minimum received SNR.

In a numerical example, the potential received SNR is 30 dB; e.g., due to a received power of −64 dBm (resulting from, for example, a transmit power of +20 dBm and a path loss of 84 dB) and a noise power level of −94 dBm. A received SNR of 30 dB enables that a relatively high data rate can be supported for the second part of the packet. A received SNR of 5 dB may suffice to enable proper performance for the first part of the packet. Consequently, the signal quality of the first part of the packet may be reduced by up to 25 dB while still achieving proper performance for the first part of the packet.

In one example, it is assumed that the channel conditions (e.g., estimated from the modulation and coding scheme used for the second part) lead to $SNR_{pot}$, and that the first part is a legacy preamble using binary phase shift keying (BPSK) modulation, i.e., $SNR_{min\_1}=0$ dB. If there is a margin, the first part may be processed to enforce a reduced received SNR, $SNR_{red}$, which leads to received SNR margins of ($SNR_{red}-SNR_{min\_1}$) dB and ($SNR_{pot}-SNR_{min\_2}$) dB for the first and second parts, respectively.

The difference value determined in step 130 may be used in step 140 to implement the SNR reduction (e.g., by one or more of: reducing the total transmission power level for the first part by the determined difference value, reducing the signal portion transmission power level for the first part by the determined difference value, adding a noise portion transmission power level to the first part which equals the determined difference value, and reducing the signal portion transmission power level for the first part and adding a noise portion transmission power level to the first part such that the power level of the reduction plus the power level of the addition equals the determined difference value).

Two possible examples for enforcing a reduced received SNR are illustrated as optional sub-steps 142 and 144.

As illustrated by sub-step 142, enforcing the reduced received SNR for the first part may comprise (deliberately) adding noise to the first part. Typically, but not necessarily, noise is added only to the first part of the packet.

The noise may be any suitable noise (e.g., random or pseudo random noise) and may have any suitable statistical properties (e.g., additive white Gaussian noise).

In some embodiments, the method 100 may also comprises generating the noise even though this is not illustrated by a method step in FIG. 1.

In some embodiments, the noise is added orthogonally to a signal of the first part in an in-phase/quadrature space.

As illustrated by sub-step 144, enforcing the reduced received SNR for the first part may comprise applying a decreased transmit power setting for the first part. Typically, but not necessarily, the transmit power setting is decreased only for the first part of the packet.

The approaches of sub-steps 142 and 144 may be used in isolation (i.e., independently) or in combination.

In one example, the approach of sub-step 144 is used in isolation and a transmission power level which is lower than the first default transmission power level is used for transmission of the first part. If the first and second default power levels have the same value, this is an example where the transmit power setting is different for the first and second parts.

In one example, the approach of sub-step 142 is used in isolation and the first default transmission power level is used for transmission of the signal portion of the first part.

Since some transmission power is needed for the noise, a transmission power level which is higher than the first default transmission power level is used for transmission of the first part (signal plus noise). If the first and second default power levels have the same value, this is an example where the transmit power setting is different for the first and second parts.

In one example, the approach of sub-step 142 is used in isolation and the first default transmission power level is used for transmission of the first part. Since some transmission power is used for the noise, a transmission power level which is lower than the first default transmission power level is used for transmission of the signal portion of the first part. Therefore, this example may be seen as implicitly using also the approach of sub-step 144. If the first and second default power levels have the same value, this is an example where the transmit power setting is equal for the first and second parts.

In one example, the approaches of sub-steps 142 and 144 are used in combination and a first reduced transmission power level which is lower than the first default transmission power level is used for transmission of the first part. Since some transmission power is used for the noise, a transmission power level which is lower than the first reduced transmission power level is used for transmission of the signal portion of the first part. If the first and second default power levels have the same value, this is an example where the transmit power setting is different for the first and second parts.

In any case, when the approach of sub-step 142 is used, the method 100 may further comprise dividing an available transmission power of the transmit power setting (e.g., the first default transmission power level, the first reduced transmission power level, a maximum transmission power level, or any other suitable power level) in first and second portions, allocating the first portion as signal transmission power for the first part, and allocating the second portion as noise transmission power for the first part; even though this is not illustrated by method steps in FIG. 1.

As illustrated by optional step 150, the method 100 may further comprise transmitting the one or more packets.

When the transmission of the one or more packets is performed in a transmission opportunity (e.g., a TX OP according to the IEEE 802.11 standards), the method 100 may further comprise transmitting a request-to-send (RTS) message at the start of the transmission opportunity, as illustrated by optional step 110.

The transmission of the RTS message may be to increase the probability that nearby devices refrain from transmission during the transmission opportunity. Increasing the probability that nearby devices refrain from transmission may be particularly important when the reduced received SNR is enforced for the first part of the packets, since such reduction of received SNR decreases the probability that nearby devices refrain from transmission. Thus, the transmission of the RTS may be used to compensate for the reduced probability of adequately receiving the first part of the packets.

In some embodiments, the transmission of the one or more packets may be performed when clear-to-send (CTS) messages is received from all relevant nearby devices (e.g., intended receivers of the basic service set, BSS), as illustrated by optional step 120.

Other alternatives for increasing the probability that nearby devices refrain from transmission during the transmission of the one or more packets may be envisioned. For example, a trigger frame may be transmitted instead of an RTS in step 110.

Figure 2:
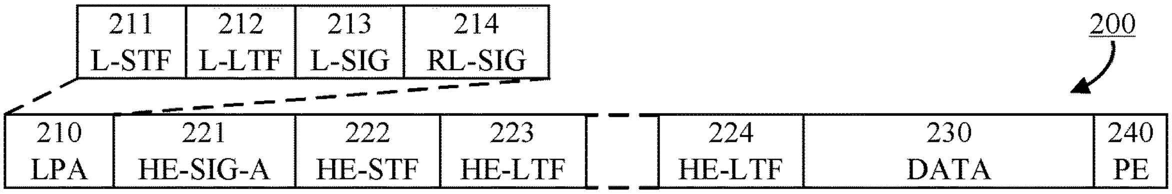
FIG. 2 is a schematic drawing illustrating an example packet according to some embodiments.

FIG. 2 schematically illustrates an example packet 200 according to some embodiments. The packet 200 is a high efficiency (HE) single user (SU) physical layer conformance procedure, PLCP, protocol data unit (PPDU). The packet 200 comprises (e.g., consists of) a legacy preamble (LPA) 210, a HE preamble, a data portion (DATA) 230, and a packet extension (PE) 240.

The legacy preamble of the packet 200 may correspond to the first part of the packet referred to herein. The second part of the packet referred to herein may correspond to the HE preamble, the data portion, and the packet extension; to the data portion, and the packet extension; or to the data portion only.

The legacy preamble comprises (e.g., consists of) a legacy short training field (L-STF) 211, a legacy long training field (L-LTF) 212, a legacy signal field (L-SIG) 213, and a repeated legacy signal field (RL-SIG) 214.

The HE preamble comprises (e.g., consists of) a HE signal field (HE-SIG-A) 221, a HE short training field (HE-STF) 222, and one or more HE long training fields (HE-LTF) 223, 224.

The legacy preamble parts 211, 212, 213 are typically used for all orthogonal frequency division multiplexing (OFDM) based frames in IEEE 802.11 transmissions; irrespective of which generation of the standard the frame complies with. The legacy preamble part 214 is used to distinguish a HE PPDU from a previous generation PPDU. The LTFs (L-LTF and HE-LTF) are suitable (and intended) for channel estimation measurements.

In communication under IEEE 802.11 (Wi-Fi) the preamble of the PPDU is used for packet detection, automatic gain control (AGC), frequency offset estimation, synchronization, indication of modulation and channel estimation. Thus, if a Wi-Fi receiver device is not able decode the preamble portion of a signal it will stop listening to the transmission, or fail to receive the transmission correctly. In order to increase the probability that an intended Wi-Fi receiver can decode a PPDU, the preamble is typically transmitted using the most robust means available; e.g., lowest code rate available and lowest modulation order available.

In wireless sensing and/or wireless positioning, the preamble of the PPDU (e.g., the LTFs) may be used to perform sensing/positioning measurements. Since the preamble is typically transmitted very robustly, it is possible for listening devices to perform such measurements at a comparatively large distance from the transmitter of the packet.

This may be an advantage when the listening device is a device in relation to which it is desirable to achieve measurements. However, when the listening device is a device under malicious control the comparatively large distance for measurements is a disadvantage.

One of the features added in the IEEE 802.11az amendment is termed secure HE-LTFs. The secure HE-LTFs should replace the default HE-LTFs 223, 224 in a HE PPDU whenever the HE PPDU is for performing a positioning measurement. The secure HE-LTFs are generated by using LTF scrambling, known only to the transmitter and the intended receiver. A purpose of the secure HE-LTFs is to prevent impersonation (e.g., spoofing attacks wherein the attacker can control the perception of range for the victim).

However, a potential problem in the context of sensing and/or positioning is that the legacy preamble typically needs to be sent without manipulations such as scrambling (since it is inherently required to be available for legacy receivers). The legacy preamble comprises potentially important information (e.g., the L-LTF) that an attacker might use for malicious purposes. Embodiments presented herein are suitable to address this problem.

This problem is relevant also for IEEE 802.11az since (even though the secure HE-LTFs mitigate attacks and eavesdropping) the legacy preamble is sent in its default format. Thereby, the legacy preamble provides synchronization information for an attacker which attempts to make a station (STA) appear closer to an access point (AP) than it actually is, and/or information suitable for channel estimations for an attacker which attempts to achieve sensing information.

Figure 3:
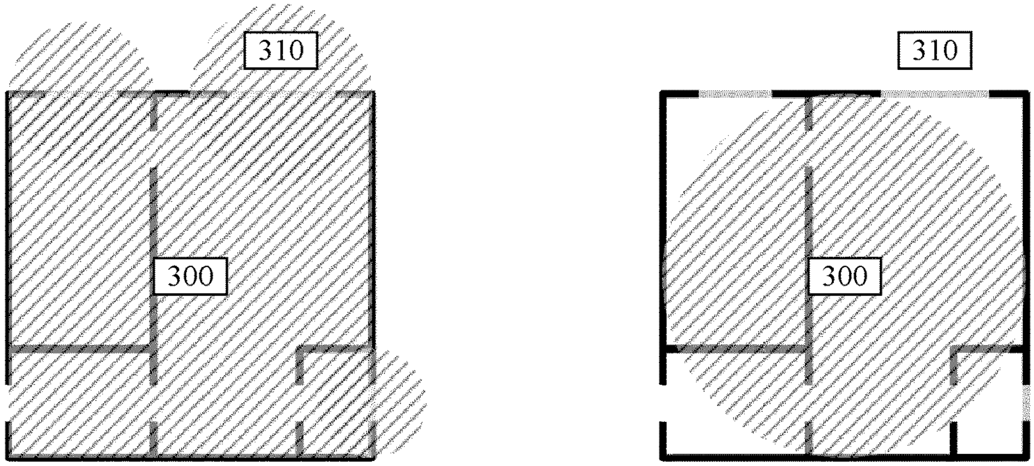
FIG. 3 is a schematic drawing illustrating example effects achievable by application of some embodiments.

FIG. 3 schematically illustrates example effects achievable by application of some embodiments. In FIG. 3, an apartment layout is schematically shown, wherein an access point (AP) 300 provides Wi-Fi within the apartment and the Wi-Fi coverage is illustrated by the diagonally striped area.

In the left part of FIG. 3, the entire apartment has Wi-Fi coverage. However, the coverage extends through the windows, which makes it possible for a device 310 under malicious control to use the legacy preamble to perform measurements for sensing, for example.

For example, an attacker could acquire channel state information (CSI) by passively listening to transmissions originating inside the apartment, and—based on the CSI—infer whether there are people inside the apartment, how many they are, where they are, etc.

To mitigate this problem, some embodiments suggest securing Wi-Fi transmissions by processing the legacy preamble portion of PPDUs before transmission such that unauthorized recipients (e.g., malicious attackers) located beyond a certain coverage area are prevented from detecting the Wi-Fi packets, or get degraded synchronization and timing (making sensing and positioning measurements performed on the legacy preamble more noisy).

In the right part of FIG. 3, the Wi-Fi coverage has been reduced by processing of the legacy preamble to enforce a reduced received SNR. Thereby, the coverage no longer extends through the windows and the device 310 cannot use the legacy preamble to perform measurements.

It should be noted that, generally, the enforcement of a reduced received SNR for the first part of one or more packets may be applied to all packets from a transmitter device, or only to some packets from a transmitter device.

For example, when a plurality of packets are transmitted in a sensing session, the reduced received SNR for the first part may be applied.

Alternatively or additionally, when the transmitter device sends packets to different receiver devices which have very different reception conditions (e.g., due to different channel conditions), the reduced received SNR for the first part may be applied only for packets intended for receiver devices with good reception conditions. For example, the reduced received SNR for the first part may be applied when the reduction has no (or very little) impact on the packet error probability.

Also generally, it should be noted that—alternatively or additionally to reducing the coverage area—the enforcement of a reduced received SNR for the first part of one or more packets may be used to control the maximum received SNR for the first part experienced by any receiver device (even a receiver device which is relatively close to the transmitter device).

Thereby, the accuracy of measurements made by any receiver device is limited, which may be helpful, for example, in spoofing attacks. For example, an attacker may aim to detect a packet intended for measurement by another (authorized) device, and fake proximity detection by transmitting an LTF with a timing advance with respect to the LTF of the authorized device. By application of some embodiments, it becomes more cumbersome for such an attacker to detect the packet and perform a timing estimate.

As already discussed, the legacy preamble of PPDUs transmitted according to IEEE 802.11 is typically characterized by using the most robust code rates and the lowest modulation orders available. This has the effect that a PPDU sent by a station (STA) in a basic service set (BSS) can be detected and correctly decoded by other STAs in the same BSS. Furthermore, it also has the effect that the PPDU can be at least detected also in overlapping BSSs (OBSSs).

Some embodiments presented herein aim to reduce the coverage area in which a legacy preamble can be detected and used for measurements, with the purpose of making it more cumbersome for devices under malicious control to use the legacy preamble for sensing and/or positioning. A possible way to achieve this is to degrade/reduce the received SNR for (only) the legacy preamble portions of the PPDUs by applying appropriate processing before transmission. In many scenarios, such degradation of the received SNR may be implemented without—or with very little—performance degradation for intended receivers (e.g., authorized STAs).

The received SNR may be reduced by reducing the transmission power for (only) the legacy preamble portion of a PPDU to be transmitted (compare with step 140, and 144, of FIG. 1). This approach directly reduces the coverage area in which the legacy preamble portion can be detected and/or correctly decoded. For sensing and/or positioning applications, one effect may be that a device (e.g., controlled by a malicious attacker) located outside the reduced coverage area is prevented from eavesdropping and making meaningful measurements using the legacy preamble. For intended receivers, the reduction of transmission power may be perceived as an effect of interference in the legacy preamble portion of the PPDU. However, since the legacy preamble portion typically features the most robust code rate available and the lowest modulation order available, the reduction in received SNR for the intended receivers is most often acceptable.

Alternatively or additionally, the received SNR may be reduced by adding (e.g., random) noise to (only) the legacy preamble portion of a PPDU to be transmitted (compare with step 140, and 142, of FIG. 1). This approach directly reduces the received SNR (at intended receivers as well as unintended receivers) with respect to the legacy preamble portion. For the intended receivers, this is typically not a problem since the legacy preamble typically features the most robust code rate available and the lowest modulation order available. Indirectly, the reduction in received SNR also results in reduction of the coverage area in which the legacy preamble portion can be detected and/or correctly decoded. Thus, for unintended receivers located outside the reduced coverage area, the added noise leads to problems in the process to properly detect the PPDU and infer correct information from the legacy preamble portion.

Compared to transmission power reduction, addition of noise offers more possibilities for control over the SNR reduction of the legacy preamble portion of a PPDU.

For example, when the signal transmit power is decreased by x dB, a reduction of x dB is achieved for the received SNR reduction, while there is uncertainty regarding the actual received SNR. When addition of noise is used instead, the transmission SNR can be controlled to a specific value $\gamma$ dB, and the actual received SNR has the same value $\gamma$ dB for all pathlosses up to a pathloss threshold value where the noise floor starts to have an impact on the actual received SNR.

Further, the addition noise may be performed in the digital domain, which typically enables more detailed tuning than control in the analog domain (e.g., in terms of higher granularity).

Also, using the approach of addition of noise offers a possibility to keep the transmission power constant over the PPDU, avoiding problems related to power level differences between the legacy preamble portion and the other parts of PPDUs.

A determination of how much the transmission power should be reduced and/or how much noise power should be added for the legacy preamble portion (compare with step 130 of FIG. 1) may, for example, be based on channel conditions, path loss estimates, modulation and coding scheme (MCS) of the non-legacy preamble portions of the PPDU, desired received SNR at the intended receivers, etc.

For example, decoding of the data may require an SNR (e.g., second required minimum SNR) which is higher than the SNR required to decode the legacy preamble (e.g., first required minimum SNR); due to the MCS applied for the data. Hence, the transmitter may reduce the SNR of the legacy preamble by a fraction of that difference without (or with very little) negative impact on performance.

Figure 4:
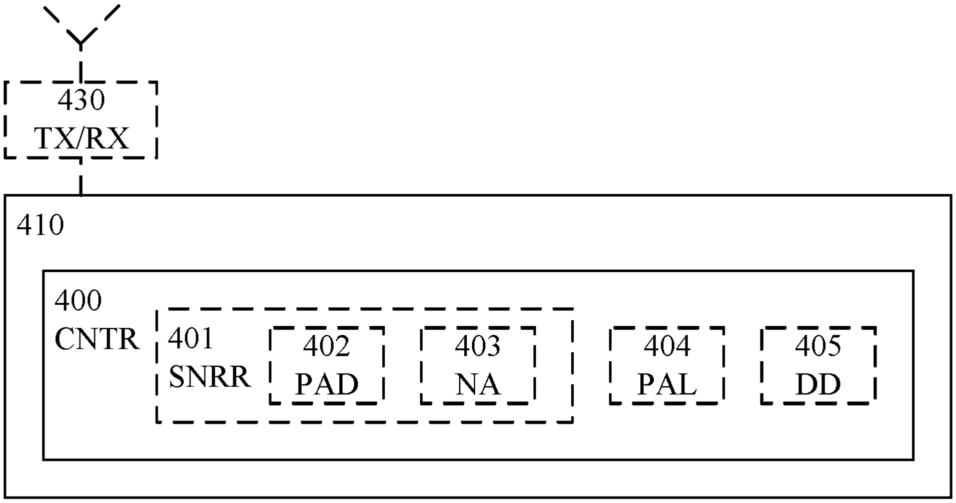
FIG. 4 is a schematic block diagram illustrating an example apparatus according to some embodiments.

FIG. 4 schematically illustrates an example apparatus 410 according to some embodiments. The apparatus 410 is for controlling transmission of one or more packets in an unlicensed communication environment based on a transmit power setting.

Each packet comprises a first part and a second part, wherein the first part is associated with a potential received SNR when the transmit power setting is used.

In some embodiments, the apparatus 410 is comprisable (e.g., comprised) in a transmitter device configured to transmit the one or more packets. An example transmitter device is an IEEE 802.11 AP.

In some embodiments, the apparatus 410 is comprisable (e.g., comprised) in a control node configured to be associated with—and control—a transmitter device, which is in turn configured to transmit the one or more packets. The control node may, for example, be a server node, a cloud-based node, a central network node, or a combination thereof.

For example, the apparatus 410 may be configured to perform, or cause performance of, one or more of the method steps described in connection to the method 100 of FIG. 1.

The apparatus 410 comprises a controller (CNTR; e.g., controlling circuitry or a control module) 400.

The controller 400 is configured to cause processing of the first part of the one or more packets before transmission, wherein the processing comprises enforcement of a reduced received SNR for the first part, which is lower than the potential received SNR (compare with step 140 of FIG. 1).

To this end, the controller 400 may comprise, or be otherwise associated with (e.g., connectable, or connected, to) an SNR reducer (SNRR; e.g., SNR reducing circuitry or an SNR reduction module) 401. The SNR reducer 401 may be configured to enforce the reduced received SNR for the first part.

The controller 400 may be configured to cause enforcement of the reduced received SNR for the first part by causing addition of noise to the first part (compare with 142 of FIG. 1) and/or application of a decreased transmit power setting for the first part (compare with 144 of FIG. 1).

To this end, the controller 400 may comprise, or be otherwise associated with (e.g., connectable, or connected, to) a power adjuster (PAD; e.g., power adjusting circuitry or a power adjustment module) 402 and/or a noise adder (NA; e.g., noise adding circuitry or a noise addition module) 403. The power adjuster 402 may be configured to apply a decreased transmit power setting for the first part (e.g., by power scaling of the first part). The noise adder 403 may be configured to add noise to the first part.

The controller 400 may be further configured to cause division of an available transmission power of the transmit power setting in first and second portions, allocation of the first portion as signal transmission power for the first part, and allocation of the second portion as noise transmission power for the first part.

To this end, the controller 400 may comprise, or be otherwise associated with (e.g., connectable, or connected, to) a power allocator (PAL; e.g., power allocating circuitry or a power allocation module) 404. The power allocator 404 may be configured to divide the available transmission power of the transmit power setting in first and second portions, allocate the first portion as signal transmission power for the first part, and allocate the second portion as noise transmission power for the first part.

The controller 400 may be further configured to cause determination of a value of a difference between the potential received SNR and the reduced received SNR (compare with step 130 of FIG. 1).

To this end, the controller 400 may comprise, or be otherwise associated with (e.g., connectable, or connected, to) a difference determiner (DD; e.g., difference determining circuitry or a difference determination module) 405. The difference determiner 405 may be configured to determine the value of the difference between the potential received SNR and the reduced received SNR.

The determination of the value of the difference between the potential received SNR and the reduced received SNR may be based on one or more of: a modulation and coding scheme for the second part, one or more parameters of a channel to an intended receiver, and a desired received SNR at the intended receiver.

To this end, the controller may comprise, or be otherwise associated with (e.g., connectable, or connected, to) a channel estimator for provision of the parameters of a channel and/or a receiver for acquisition of an indication of the parameters of a channel from the intended receiver.

The controller 400 may be further configured to cause transmission of the one or more packets (compare with step 150 of FIG. 1).

To this end, the controller 400 may comprise, or be otherwise associated with (e.g., connectable, or connected, to) a transmitter (e.g., transmitting circuitry or a transmission module); illustrated in FIG. 4 as part of a transceiver (TX/RX) 430.

The transmitter comprised in the transceiver 430 may be configured to transmit the one or more packet (e.g., when the apparatus is comprised in a transmitter device), or to transmit (e.g., to a transmitter device) a control signal indicative of the processing to be applied to the first part of the one or more packets before transmission (e.g., when the apparatus is comprised in a control node).

The controller 400 may be further configured to cause transmission of a request-to-send (RTS) message at the start of a transmission opportunity in which the one or more packet are to be transmitted (compare with step 110 of FIG. 1), and receipt of corresponding clear-to-send (CTS) messages (compare with step 120 of FIG. 1).

It should be noted that features described in connection to method 100 of FIG. 1 may be equally applicable in for the apparatus of FIG. 4, even if not explicitly mentioned in connection thereto.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a transmitter device (e.g., a radio access node) or a control node.

Embodiments may appear within an electronic apparatus (such as a transmitter device or a control node) comprising arrangements, circuitry, and/or logic according to any of the embodiments described herein. Alternatively or additionally, an electronic apparatus (such as a transmitter device or a control node) may be configured to perform methods according to any of the embodiments described herein.

Figure 5:
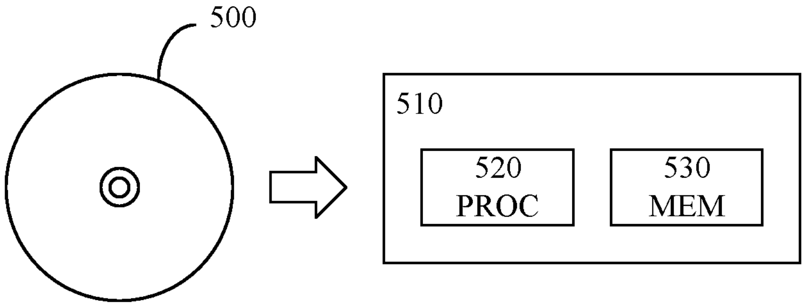
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a transmitter device or a control node 510. When loaded into the data processor, the computer program may be stored in a memory (MEM) 530 associated with or comprised in the data processor. According to some embodiments, the computer program may, when loaded into and run by the data processor, cause execution of method steps, for example, as illustrated in FIG. 1 or as otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for transmission of one or more packets in an unlicensed communication environment based on a transmit power setting, each packet comprising a first part and a second part, the first part being associated with a potential received signal-to-noise ratio, SNR, when the transmit power setting is used, the method comprising:

processing the first part of the one or more packets before transmission, the processing comprising enforcing a reduced received SNR for the first part, which is lower than the potential received SNR.

2. The method of claim 1, wherein enforcing the reduced received SNR for the first part comprises adding noise to the first part.

3. The method of claim 2, wherein the noise is added orthogonally to a signal of the first part in an in-phase/quadrature space.

4. The method of claim 2, further comprising dividing an available transmission power of the transmit power setting in first and second portions, allocating the first portion as signal transmission power for the first part, and allocating the second portion as noise transmission power for the first part.

5. The method of claim 2, wherein the transmit power setting is equal for the first and second parts.

6. The method of claim 1, wherein enforcing the reduced received SNR for the first part comprises applying a decreased transmit power setting for the first part.

7. The method of claim 1, wherein a first required minimum received SNR associated with the first part when the transmit power setting is used is lower than a second required minimum received SNR associated with the second part when the transmit power setting is used.

8. The method of claim 7, wherein a difference between the potential received SNR and the first required minimum received SNR is larger than a difference between the reduced received SNR and the first required minimum received SNR.

9. The method of claim 1, further comprising determining a value of a difference between the potential received SNR and the reduced received SNR.

10. The method of claim 9, wherein the value of the difference between the potential received SNR and the reduced received SNR is determined based on one or more of: a modulation and coding scheme for the second part, one or more parameters of a channel to an intended receiver, and a desired received SNR at the intended receiver.

11. An apparatus for controlling transmission of one or more packets in an unlicensed communication environment based on a transmit power setting, each packet comprising a first part and a second part, the first part being associated with a potential received signal-to-noise ratio, SNR, when the transmit power setting is used, the apparatus comprising controlling circuitry configured to cause:

processing of the first part of the one or more packets before transmission, the processing including enforcement of a reduced received SNR for the first part, which is lower than the potential received SNR.

12. The apparatus of claim 11, wherein enforcement of the reduced received SNR for the first part comprises addition of noise to the first part.

13. The apparatus of claim 12, wherein the addition of the noise is orthogonally to a signal of the first part in an in-phase/quadrature space.

14. The apparatus of claim 12, wherein the controlling circuitry is further configured to cause division of an available transmission power of the transmit power setting in first and second portions, allocation of the first portion as signal transmission power for the first part, and allocation of the second portion as noise transmission power for the first part.

15. The apparatus of claim 12, wherein the transmit power setting is equal for the first and second parts.

16. The apparatus of claim 11, wherein enforcement of the reduced received SNR for the first part comprises application of a decreased transmit power setting for the first part.

17. The apparatus of claim 11, wherein a first required minimum received SNR associated with the first part when the transmit power setting is used is lower than a second required minimum received SNR associated with the second part when the transmit power setting is used.

18. The apparatus of claim 17, wherein a difference between the potential received SNR and the first required minimum received SNR is larger than a difference between the reduced received SNR and the first required minimum received SNR.

19. The apparatus of claim 11, wherein the controlling circuitry is further configured to cause determination of a value of a difference between the potential received SNR and the reduced received SNR.

20. The apparatus of claim 19, wherein the determination of the value of the difference between the potential received SNR and the reduced received SNR is based on one or more of: a modulation and coding scheme for the second part, one or more parameters of a channel to an intended receiver, and a desired received SNR at the intended receiver.

* * * * *